United States Patent [19]

Choi et al.

[11] Patent Number: 5,222,242

[45] Date of Patent: Jun. 22, 1993

[54] SYSTEM FOR LOCATING A NODE CONTAINING A REQUESTED RESOURCE AND FOR SELECTIVELY VERIFYING THE PRESENCE OF THE RESOURCE AT THE NODE

[75] Inventors: Owen H. Choi, Raleigh; John E. Drake, Jr., Pittsboro; James C. Fletcher, Cary; Johnathan L. Harter; Jeffrey G. Knauth, Raleigh; Dirk K. Kramer, Raleigh; Michael A. Lerner, Raleigh; Joseph L. McKinnon, Raleigh; Lee M. Rafalow; William E. Siddall, both of Chapel Hill; Melinda P. Stump, Cary, all of N.C.

[73] Assignee: International Business Machines Corp., Armonk, N.Y.

[21] Appl. No.: 589,356

[22] Filed: Sep. 28, 1990

[51] Int. Cl.⁵ .................. G06F 13/14; G06F 13/00
[52] U.S. Cl. ......................... 395/800; 395/600;
    395/325; 364/241; 364/241.1; 364/242.94;
    364/284.3; 364/284.4; 364/DIG. 1; 364/940.4;
    364/940.5; 364/940.63; 340/825.52
[58] Field of Search ............ 395/800, 325, 600, 200;
    340/825.52

[56] References Cited

U.S. PATENT DOCUMENTS

| 4,800,488 | 1/1989 | Agrawal et al. | 395/800 |
| 4,914,571 | 4/1990 | Baratz et al. | 395/600 |
| 4,941,084 | 7/1990 | Terapa et al. | 395/650 |
| 5,014,192 | 5/1991 | Mansfield et al. | 395/600 |
| 5,109,486 | 4/1992 | Seymour | 395/200 |

Primary Examiner—Robert B. Harrell
Assistant Examiner—Paul Harrity
Attorney, Agent, or Firm—Gerald R. Woods

[57] ABSTRACT

The present invention is an improvement in a known LOCATE process used to locate resources in a computer network. The known LOCATE process always requires that information about a target resource be verified by forwarding a LOCATE request to the node owning the target resource. The present invention improves upon this process by use of selective verification. If predetermined conditions are met, a node in the network may reply to a received LOCATE request by using information about the target resource found in its cache directory. The LOCATE request need not be propagated to the node owning the target resource except for predetermined types of sessions or where past attempts to use selective verification have not been successful.

13 Claims, 9 Drawing Sheets

SYSTEM FOR LOCATING A NODE CONTAINING A REQUESTED RESOURCE AND FOR SELECTIVELY VERIFYING THE PRESENCE OF THE RESOURCE AT THE NODE

BACKGROUND OF THE INVENTION

1. Field of the Invention

The present invention relates to computer networks and more particularly to a method of locating a resource in such a network without necessarily requiring verification of the location and characteristics of the resource.

2. Prior Art

A data communications network can generally be defined as a collection of network nodes and end nodes interconnected through communications links. A network node is a data processing system that provides certain functions within the network, such as routing of messages between itself and neighboring nodes, selection of routes for messages to be transmitted between two nodes and furnishing of directory services to served end nodes. The links between nodes may be permanent communications links such as conventional cable connections or links that are enabled only when needed, such as dial-up connections through public or private telephone systems. End nodes are exemplified by devices such as display terminals, intelligent workstations and the like, which do not provide routing or route selection or directory services to other nodes in the network. End nodes may include processors that do not perform services of the kinds performed by network nodes. Collectively, the network nodes, the end nodes and the links between the nodes are referred to as network resources. The physical configuration and characteristics of the various nodes and links are said to be the topology of the network.

Each of the nodes contains one or more network addressable units, each containing a resource that can be a source or target for communications directed through the network. The following description uses the term logical unit or LU to identify the interface between an end user located at a network addressable unit and the remainder of the network. The term end user encompasses both human users and computer programs being executed at the network addressable unit.

To select a route between any two resources at different logical units in a network or to set up a logical connection or session between those two logical units requires that the node responsible for route selection or session establishment have information about both the resources. The necessary information includes the location and characteristics of each resource.

It is, at least theoretically, possible to set up a network in which information about every new, deleted or changed resource is communicated to a single network operator. Such an operator would be responsible for compiling all such information and communicating it to every node which performs a route selection or session establishment function. Such an approach might work for a small, relatively static (i.e., unchanging) network.

However, few data communications network can be characterized as either small or static. Most networks are both large and extremely dynamic in that resources are often moved, added, deleted or assume new characteristics (e.g., available/not available) while remaining in the network.

The volume and frequency of changes in resources in a typical data communications network could overwhelm a single network operator. Delays in receiving, compiling and distributing the resource change information could result in futile attempts by network nodes to select routes or set up sessions based on outdated information received from the single network operator.

A process for permitting a network node to locate a target resource in a data communications network is described in U.S. Pat. No. 4,914,571, issued Apr. 3, 1990, and assigned to the assignee of the present invention. According to the teachings of that patent, a network node responsible for setting up a session between a source logical unit and a target logical unit can perform a LOCATE search to dynamically locate the target and acquire needed information about the characteristics of the target. The location and characteristics are used by the network node in setting up the session between the source and target logical units.

Further details of the patented process are incorporated into the technical description of the present invention. It is important to note that the LOCATE process taught in the patent requires that every LOCATE search be propagated fully to the node containing the target logical unit, regardless whether an intervening network node possesses cached information about the target resource. A full LOCATE search has the advantage that it will result in current resource location/characteristic information being retrieved as a result of every search.

However, performing a full LOCATE search in every instance is not without its disadvantages. Waiting for a full LOCATE search to be completed can delay the establishment of sessions. Moreover, full LOCATE searches increase network traffic "overhead" since those searches take network time that could otherwise be devoted to the transfer of data between end users.

SUMMARY OF THE INVENTION

The present invention is a system for permitting a network resource to be dynamically located wherein the location and characteristics of the resource are not always verified. A LOCATE search performed in accordance with the present invention is not extended to the target resource in every instance.

The invention is practiced in a computer network having end nodes and network nodes and resources associated with each of the nodes. Each end node is served by at least one network node, which has a cache directory of information relating to the location and characteristics of at least some of the resources in the network. The invention relates to a method or system for initiating establishment of a session between a source logical unit associated with a network node and a target logical unit associated with the same or another network node.

In accordance with the method steps, a LOCATE request is generated at the source logical unit. The LOCATE request identifies a target resource and includes a verification flag indicating whether or not the location and characteristics of the target resource must be verified in a response to the LOCATE request. The LOCATE request is transmitted to the network node serving the source node and is processed there in the following series of operations. The serving network node searches its own cache directory for any entries relating to the target resource. If no entry is found, the serving network node directs searches to other nodes in the network. If an entry is found in a searched cache directory at the network node which serves the target resource, the flag in the LOCATE request is checked to determine whether verification is required. If verification is not required, a LOCATE reply is returned through the network to the network node serving the source resource. If verification is required, the LOCATE request is forwarded to the node identified in the cache entry as containing the target resource.

BRIEF DESCRIPTION OF THE DRAWINGS

While the specification concludes with claims particularly pointing out and distinctly claiming that which may be regarded as the present invention, details of a preferred embodiment of the invention may be more readily ascertained from the following technical description, when read in conjunction with the accompanying drawings wherein:

DESCRIPTION OF PREFERRED EMBODIMENT

Figure 1:
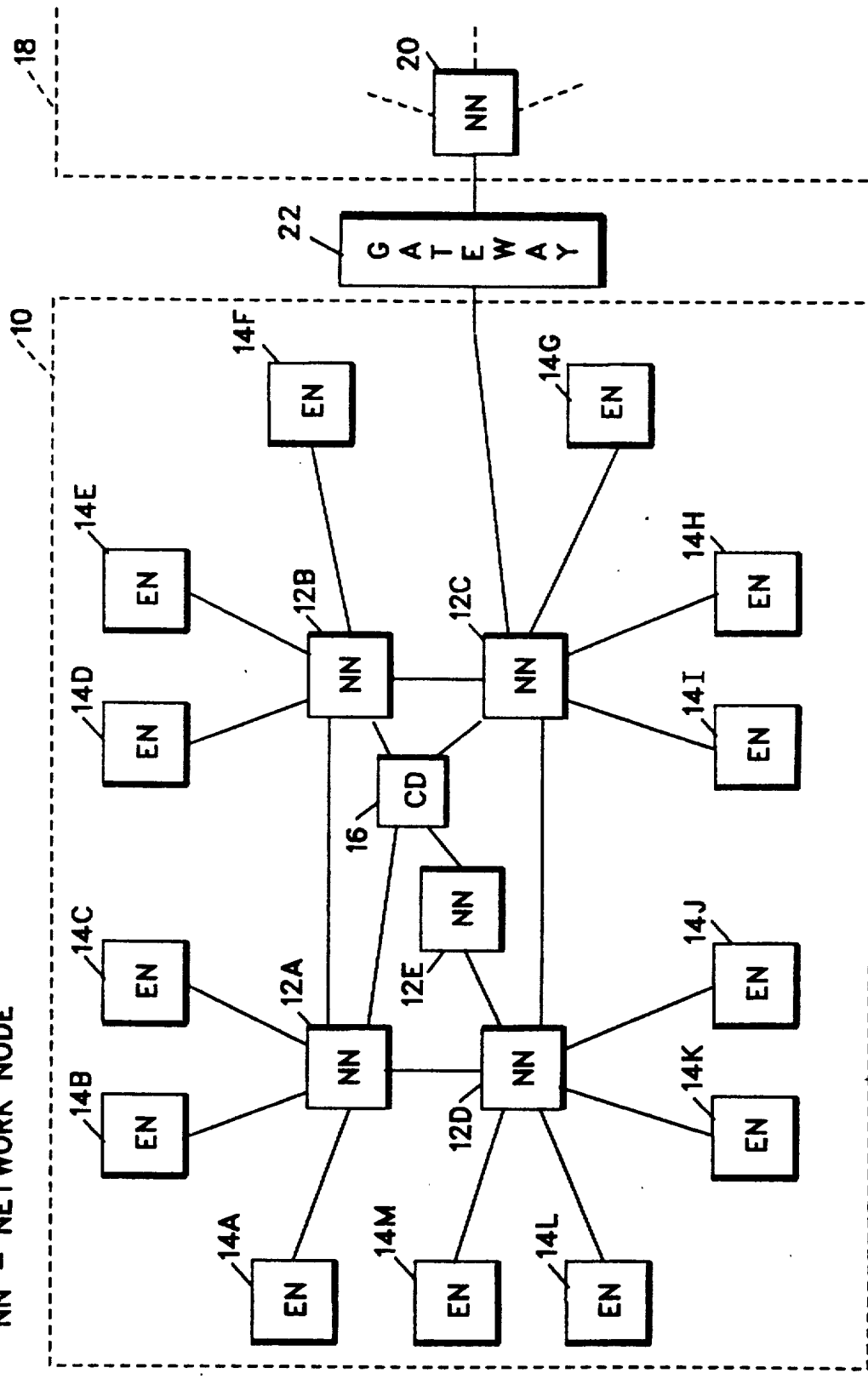
FIG. 1 is a block diagram of the physical components of a computer network.

FIG. 1 is a representation of a typical computer network in which a LOCATE process may be used to locate a target resource. The terms used in describing the network and its components are consistent with terminology used to describe computer networks which implement a well known type of computer architecture called System Network Architecture or SNA.

Comprehensive descriptions of the SNA architecture may be found in a number of publications, including *IBM Systems Network Architecture-Format and Protocol Reference Manual: Architecture Logic* (SC30-3112), or *SNA: IBM's Networking Solution*, James Martin and Kathleen K. Chapman, Prentice-Hall, Inc., Englewood Cliffs, NJ. While such publications may allow a reader to appreciate some of the subtleties of SNA, the publications are not needed to understand or practice the present invention. There is no intent to incorporate the contents of such publications by reference.

Block 10 identifies a first network which includes a set of network nodes 12A through 12E, another set of end nodes 14A through 14M and a central directory node 16.

Network 10 may be linked to other networks such as a network 18 represented in part by a network node 20. The two networks are linked through a special network node 22 known as a gateway or interface node.

End users communicate with each other in conversations carried over sessions established between a source logical unit and a target logical unit. A session is established when a first node sends a BIND request to a second node. The BIND request specifies the protocols that both of the nodes are to abide by for the duration of the session. The BIND sender is known as the primary logical unit or PLU while the BIND receiver is known as the secondary logical unit or SLU.

For any session to be established, the location and characteristics of each resource (source and target) must first be known. The location and characteristic information can be stored in directories at the end nodes, network nodes and central directory node. Like a gateway node, a central directory node is a special network node. A central directory node has a large cache directory for storing information about resources located throughout the network.

Every node has a local diretory containing information about its own resources. In the case of a network node, the local directory, sometimes referred to as a domain directory, contains information about resources at the network node and resources at each of the end nodes served by the network node. A network node also typically has a cache or cross domain directory containing information about resources located elsewhere in the network or in other networks connected through gateway nodes.

Cache entries may be accumulated in different ways. One way is to load the cache directory with resource information when the system or network is initially being defined. Another way is to retain the results of earlier search or LOCATE operations. It must be recognized that cache entries initially provided during system definition may be altered or even deleted as a result of subsequent LOCATE operations. It must also be recognized that a LOCATE operation may result in an addition of a resource to a cache directory where that resource did not exist at the time of system definition.

Figure 2:
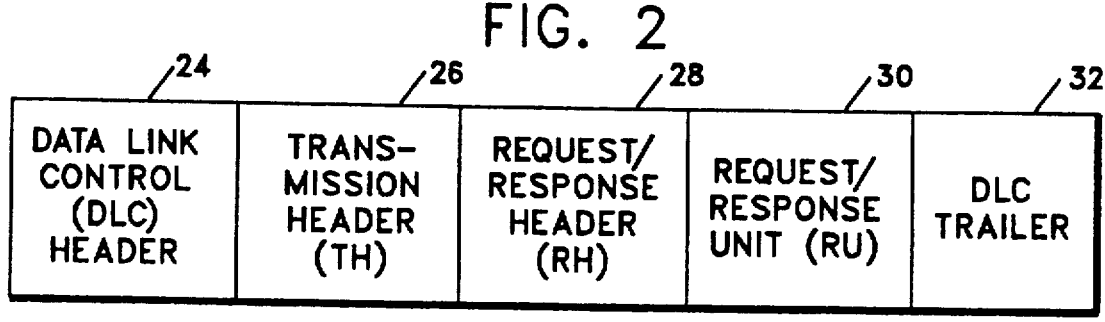
FIG. 2 shows the standard format of a frame or basic link unit which is transmitted between nodes in a preferred form of computer network.

LOCATE operations are performed using LOCATE messages transmitted using a SNA basic link unit or frame. FIG. 2 shows the format of a general SNA frame, which contains multiple fields or units. Each frame includes a Data Link Control or DLC header 24, a Transmission Header or TH 26, a Request/Response Header or RH 28, a Request/Response Unit or RU 30 and a DLC trailer 32. Briefly, the DLC header 24 and DLC trailer 32 are used to control the transmission of the frame between two adjacent nodes over the particular physical media connecting those two nodes and to recover from any errors that might be introduced during transmission while the Transmission Header 26 contains source and destination address information and other path control information needed to transmit the frame along a multi-node path. The Request/Response Header 28 contains control information related to the following Request/Response Unit 30, which defines the type of Request or Response being made in the frame. Further details about each of the fields in a frame may be found in the references mentioned earlier.

This description may, from time to time, refer to a LOCATE request frame or a LOCATE reply frame. It should be kept in mind that there is no special frame and that the reference is just a brief way of referring to a conventional frame that happens to contain a LOCATE request or a LOCATE reply.

Figure 3:
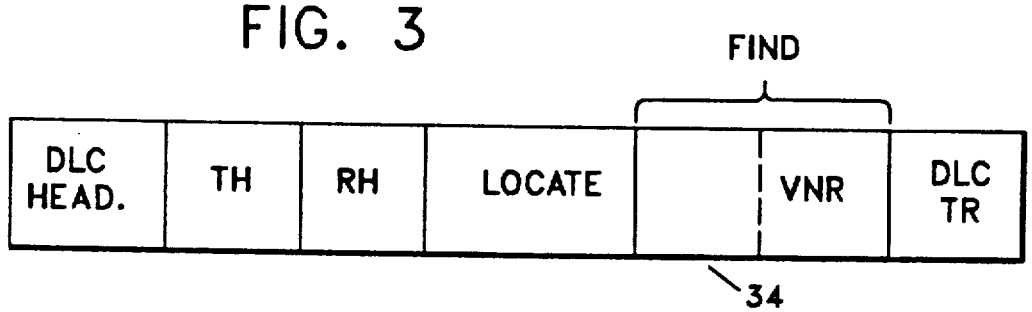
FIG. 3 shows a frame containing a LOCATE request.

FIG. 3 represents a SNA frame carrying a LOCATE request or LOCRQ generated to search for a network resource. The unique portion of the LOCATE request is the Request/Response Unit field 34 which identifies the frame as a LOCATE request frame. Field 34 includes a VNR or Verify Not Required field or flag needed for practice of the present invention. For the sake of simplicity, the Verify Not Required flag may be referred to as the "verification flag" elsewhere in this document. The Verify Not Required flag is an indication to any network node receiving the LOCATE request frame that the location and characteristics of a target resource do not necessarily need to be verified by forwarding the request to the node which owns the target resource. If a network node has a cache entry relating to the target resource, that node may reply to the LOCATE request directly. The conditions under which a LOCATE request is issued with its Verify Not Required flag in a set state and the conditions under which a network node will provide a LOCATE reply without verification are discussed with reference to later figures.

Figure 4:
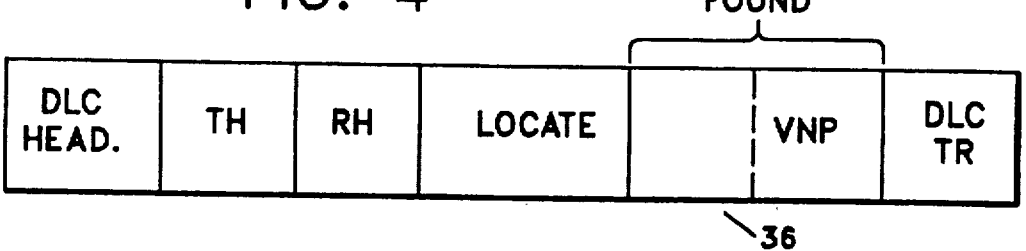
FIG. 4 shows a frame containing a LOCATE reply.

FIG. 4 represents an SNA frame suitable for a LOCATE Reply. The LOCATE reply frame is unique in that it includes a Request/Response Unit 36 containing information about the target resource and a Verify Not Performed or VNP flag. If the Verify Not Performed flag is set in the LOCATE reply, any node receiving the LOCATE reply will know that the location and characteristics of the target resource were not verified before the LOCATE reply was generated by a network node.

Figure 5:
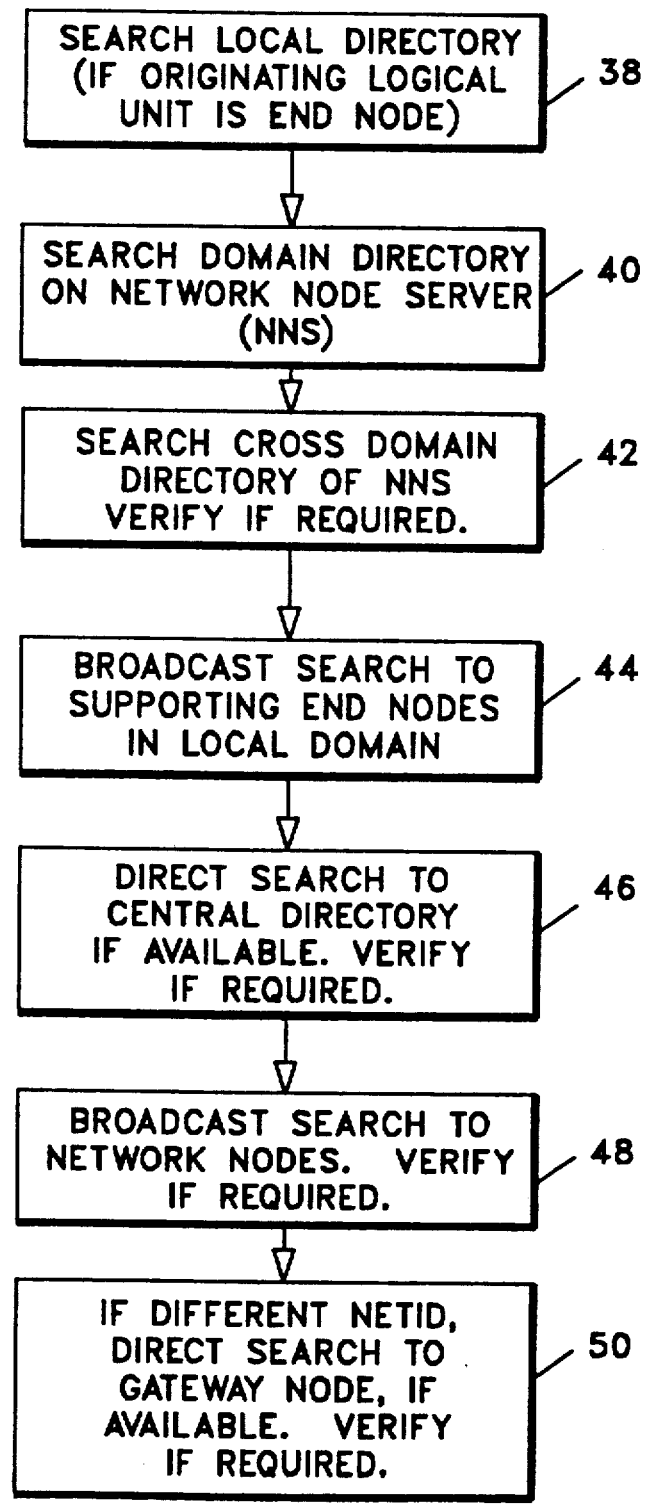
FIG. 5 is a high level flow chart of a LOCATE process which may incorporate the present invention.

FIG. 5 is a high level flow chart of a LOCATE process. Basic LOCATE operations are taught in U.S. Pat. No. 4,914,571 referenced earlier. The difference between the basic LOCATE operations and operations in accordance with the present invention are incorporated into the discussion of the figure.

In accordance with the present invention, a node originating a LOCATE request may issue that request with the Verify Not Required flag set to indicate that verification is not always required. The conditions under which the Verify Not Required flag will be set are described later with reference to FIG. 6.

If a LOCATE request is originated by a resource located at an end node, the initial operation in the LOCATE process is an operation 38 in which the end node searches its local directory for information about the target resource identified in the LOCATE request. Each end node contains information only about its own resources and is considered to be the owner of those resources. If the source and target resources are owned by the same end node, it is immaterial whether the Verify Not Required flag in the LOCATE request is set.

Assuming the target resource is not at the same end node as the source resource, the LOCATE request is forwarded to the network node server which provides services for the originating end node. In an operation 40, the network node server searches its domain directory for entries relating to the target resource. The domain directory includes entries for resources owned directly by the network node and entries for resources known to be owned by the end nodes attached directly to the network node. If an entry for the target resource is found in the domain directory and the Verify Not Required flag is set in the LOCATE request, the serving network node will, if appropriate, return a LOCATE reply directly to the originating node with the Verify Not Performed flag set to indicate that the location and characteristics of the target resource were not verified by forwarding the LOCATE reply to the node owning the target resource.

If a target resource entry is not found in the domain directory of the originating network node, that node then searches its cross domain directory in an operation 42 for cache entries relating to resources located in other domains. If the cross domain search reveals an entry relating to the target resource, a LOCATE reply may be returned to the originating end node if it is determined that verification is not necessary. Otherwise, the originating network node server will broadcast (in operation 44) the LOCATE request to each end node in its domain that is capable of supporting the LOCATE process. Not all end nodes in any computer network necessarily have the same capabilities. Some end nodes, particularly older ones, may not support LOCATE operations and it would be futile to broadcast any such request to such nodes.

If the target resource is found after a broadcast search to supporting end nodes in the domain, a LOCATE reply will be generated by the end node owning the resource. The Verify Not Performed flag in the LOCATE reply will be reset to indicate that information about the target resource has been verified.

If operation 44 fails to find the target resource in the domain, the search is directed to the central directory node in an operation 46, assuming a central directory node has been defined in the network. If the central directory node has a cache entry for the target resource, it may return a LOCATE reply through the network with the Verify Not Performed flag set where appropriate.

Assuming the target resource is not found in the central directory, the next operation 48 calls for the LOCATE search request to be broadcast to other network nodes in the network. The broadcast operation is performed by the central directory node, if one exists. If no central directory node has been defined, the broadcast operation is performed by the network node serving the node containing the source resource.

A network node receiving the broadcast search may return a LOCATE reply directly if it has a cache entry for the target resource and verification is not required.

In a preferred embodiment of the invention, only the network nodes serving either the source resource or the target resource can return the LOCATE reply without verification. According to an alternative embodiment, any network node having an appropriate cache entry may return the LOCATE reply without verification. Even if a node does return the LOCATE reply without verification, the node forwards the LOCATE request to adjacent network nodes to avoid a race condition.

If the target resource is not found by any of the network nodes in the network as a result of the broadcast search, the LOCATE request may be forwarded to the second network through the gateway node in an operation 50. If a network node in the second network that is connected directly to the gateway node has a cache entry for the target resource and determines that verification is not required, that network node generates a LOCATE reply and returns it to the originating network node server in the first network through the gateway node. Otherwise, the LOCATE request is propagated through the second network in a series of operations similar or perhaps identical to those performed in the first network.

Figure 6:
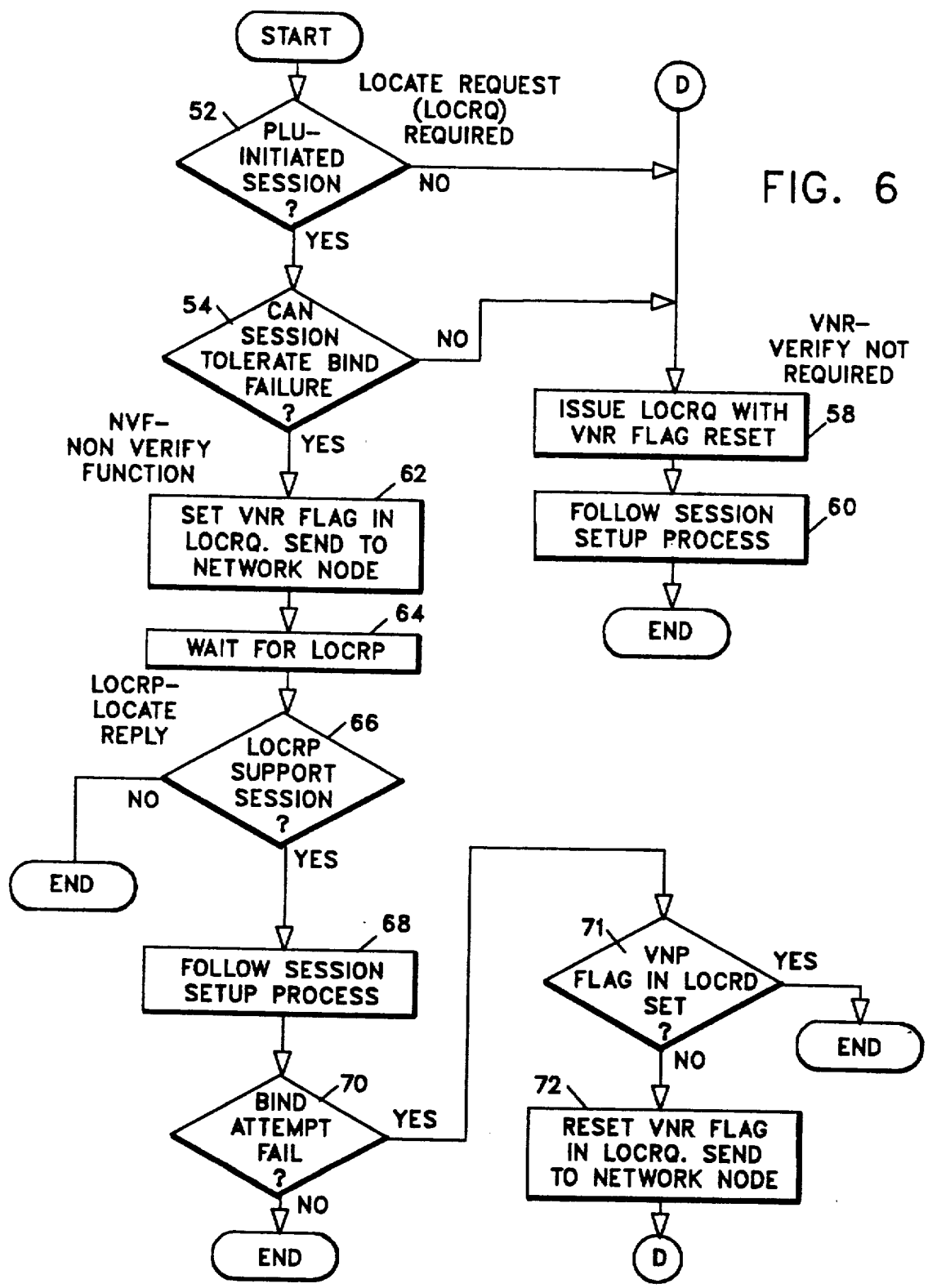
FIG. 6 is a flow chart of steps performed at a source node in generating a LOCATE request in accordance with the present invention.

FIG. 6 is a flow chart of steps performed at a node originating a LOCATE request in accordance with the present invention. The node may either be an end node or a network node supporting the source resource. The same basic steps are followed in generating a LOCATE request in either type of node.

Assuming that a LOCATE request is required, a check 52 is made to determine whether the request would be used in setting up a session initiated by a primary logic unit or PLU. Under limited conditions, a secondary logic unit or SLU may generate a LOCATE request. For reasons which are not important here, resource verification is always required for any SLU-initiated LOCATE request and subsequent session.

If the prospective session is found to be a PLU-initiated one, a check 54 is then made as to whether the session is of a type that can tolerate a BIND failure; that is, a failure to successfully complete session establishment. Certain types of sessions are considered tolerant of BIND failures, including sessions used for search operations, sessions used to initiate operations and sessions used to initiate-or-queue operations.

If the session cannot tolerate a BIND failure or if the session is not PLU initiated, the LOCATE request is issued in an operation 58 with the Verify Not Required flag having its reset value. The subsequent LOCATE process will be performed essentially as described in U.S. Pat. No. 4,914,572. A normal session establishment process 60 will be followed.

If operations 52 and 54 have a positive result, then verification is not required by the originating node. In operation 62, the Verify Not Required flag is set in the LOCATE request and the request is forwarded to the network node server where the LOCATE request originates at an end node. If the request originates directly at the network node, the step of forwarding the request is obviously not necessary.

The originating node must then wait for a LOCATE reply as indicated by block 64 before it can take further steps to establish the requested session. If an operation 66 shows the received LOCATE reply does not support establishment of a session, the process is ended. LOCATE replies that do not support session establishment include ones indicating the target could not be found or, if found, is currently inaccessible. However, if the LOCATE reply does support session establishment, the normal session setup process is followed in an operation 68.

If the session is not successfully established, a check 70 is made to see whether the failure was attributable to the BIND process. If so, the state of the Verify Not Performed (VNP) flag in the earlier LOCATE reply is checked in operation 71. If the flag state indicates information about the target resource was verified during the LOCATE process, nothing else is done. If, however, the target resource information is found not to have been verified in the earlier LOCATE process, the Verify Not Required flag in a LOCATE request is reset by the originating node in an operation 72 and the LOCATE request is reissued. The reissued LOCATE request will require verification of the location and characteristics of the target resource. If check 70 shows the BIND failed for reasons other than the use of the NVF function, any attempt to establish the session is aborted and the process is ended.

Figure 7A:
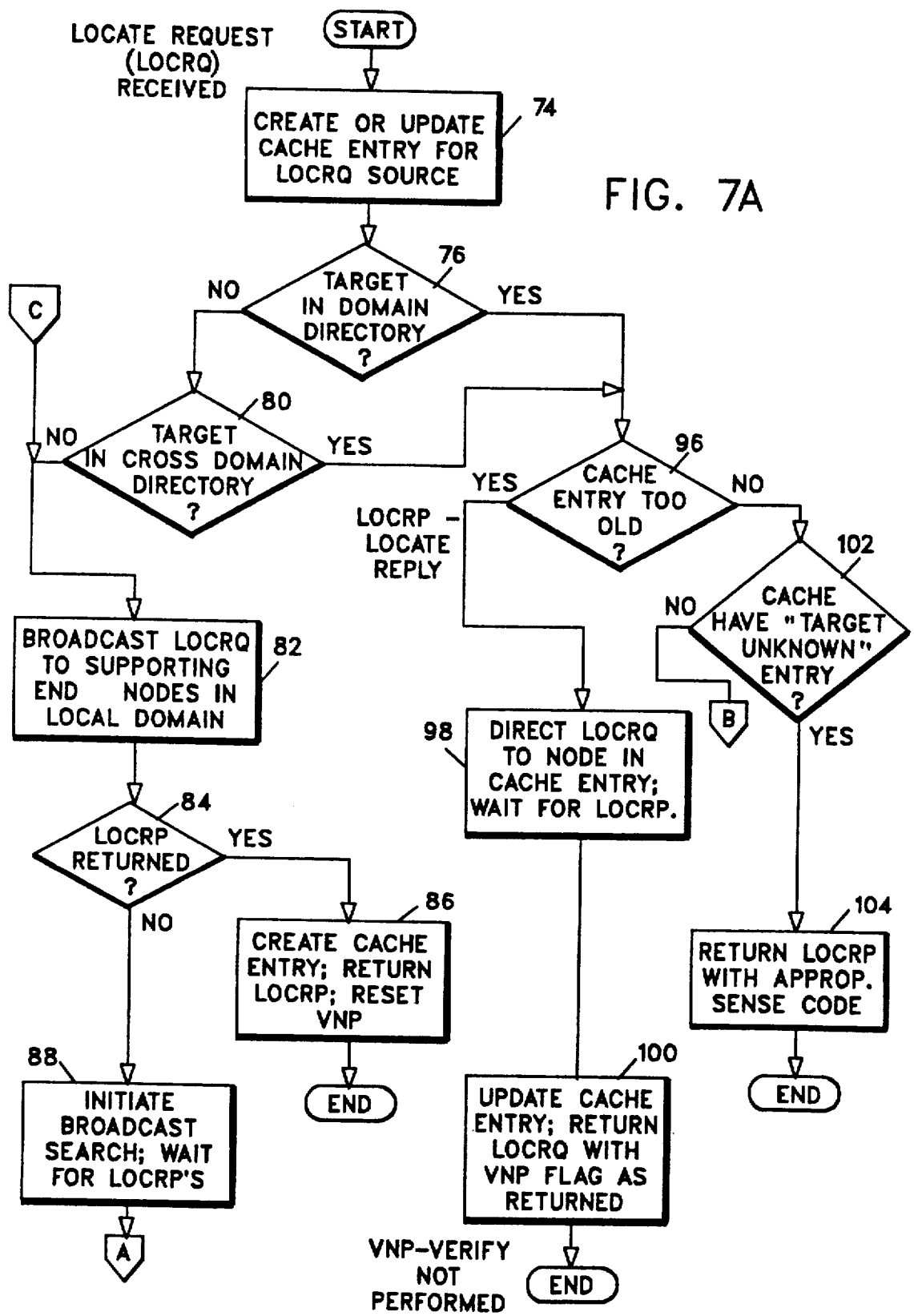
FIG. 7, consisting of FIGS. 7A and 7B taken together, is a flow chart of steps performed at a network node upon receipt of a LOCATE request generated in accordance with the present invention.
Figure 7B:
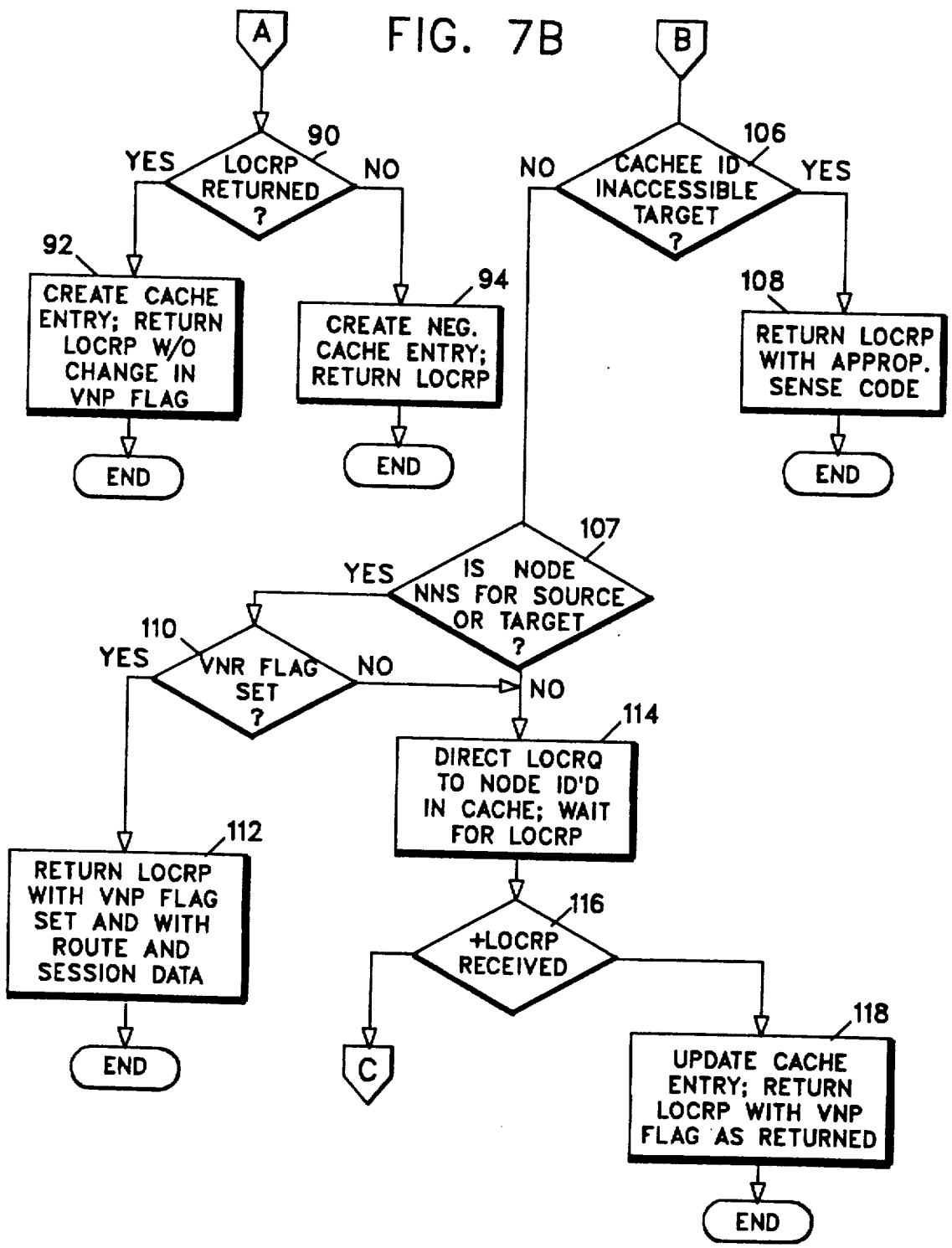

FIG. 7, consisting of FIGS. 7A and 7B taken together, is a flow chart of the steps performed at a network node receiving a LOCATE request. The receiving network node uses the source information in the LOCATE request to create or update a cache entry for the source in an operation 74. A check 76 is then made to see if the target resource is located in the network node's domain directory.

If operation 76 shows that the domain directory has no entry for the target, a check 80 is made to see if such an entry exists in the network node's cross domain directory. If there is no entry for the target resource in the cross domain directory, the LOCATE request is broadcast in operation 82 to those end nodes in the domain that support LOCATE Requests. The network node then waits for responses from those end nodes. If a check 84 reveals that one of the end nodes has responded as the owner of the target resource, the network node will, in operation 86, cache information about the target resource in its domain directory and pass the LOCATE reply to the uptree node.

If operation 84 indicates that the target resource can not be found in the domain, a broadcast search is initiated in operation 88 and the broadcasting node waits for LOCATE replies from those nodes. As indicated earlier, the LOCATE request will be broadcast beyond the immediately adjacent nodes. Also, as noted earlier, the broadcast search is performed by the network node serving the source resource if no central directory node is defined in the network. If a central directory node is defined, that node initiates the broadcast search.

If a check 90 shows the broadcasting node receives at least one positive LOCATE reply, meaning the target resource has been found, information in the LOCATE reply is used to create a cache entry in an operation 92. It is possible or even likely that a node may receive multiple positive replies. All positive replies after the first are ignored by the node. The LOCATE reply is then passed to the uptree node. The fact that a target resource has been found does not necessarily mean the resource is currently available. It may mean that the resource exists, but is temporarily inaccessible.

It is possible that the target resource may be unknown to any of the nodes in the network. Commonly, an unknown resource is one that existed at one time but which has been removed from the network for some reason. If check 90 shows that no positive LOCATE replies are received as a result of the broadcast, a negative cache entry, indicating an unknown target, is generated in an operation 94 and a LOCATE reply with an appropriate sense code or value is passed to the uptree node.

The completion of either operation 92 or operation 94 ends the network node's participation in the LOCATE process.

Referring back to operations 76 and 80, if either shows that a directory at the network node contains an entry for the target resource, the "age" of that directory entry must be checked in an operation 96. A directory entry for a resource is assigned a timer value upon creation or update of the entry. The time value is indicative of the length of time the information in the entry is to be considered valid. If that time has expired before the entry is accessed, the entry is considered to be too old to be reliable.

If the entry's timer has expired, the network node uses the information in the cache entry to direct a LOCATE request (operation 98) to the node identified as owning the target resource. The LOCATE request is passed on in a directed search without changing the Verify Not Required flag. The node must then wait for a response to its directed search.

When a LOCATE reply is received, the directory entry is updated in an operation 100. The LOCATE reply is passed on to the uptree node without changing the Verify Not Performed flag value in the LOCATE reply. Operation 100 ends the network node's participation in the LOCATE process.

Referring back to operation 96, if the operation shows that the directory entry timer has not expired, a check 102 is made to see whether the directory entry indicates a previous LOCATE operation for the same target failed to find the resource; that is, the resource was previously identified as being unknown. If an "unknown resource" directory entry is found, a negative LOCATE reply is returned to the uptree node with an appropriate sense code. The network node's participation in the LOCATE process is then terminated.

If check 102 indicates, however, that the resource is known, a further check 106 is made to determine whether the resource is identified by the entry as being inaccessible. For example, if the resource is already in use, it is probably unavailable (inaccessible) for other sessions. If the resource is identified as inaccessible, a LOCATE reply is returned to the uptree node in an operation 108 with an appropriate sense code. Completion of operation 108 ends the LOCATE process at the node.

If, on the other hand, check 106 indicates the resource is not identified as inaccessible, a preferred embodiment of the invention includes a check 107 which determines whether the network node processing the LOCATE request is the designated network node server for either the source or the target node. If it is, the LOCATE request is checked in operation 110 to determine whether the Verify Not Required flag is set. If the Verify Not Required flag is found to be set, the directory entry for the target resource is incorporated into a LOCATE reply in an operation 112 to provide route and session information to the network node serving the source. The LOCATE reply is returned with the Verify Not Performed flag set to complete the LOCATE process for the network node. If the processing network node is an intermediate node, the cached information is used in operation 114 to direct the LOCATE request to the appropriate node without regard to the state of the Verify Not Required flag.

Referring back to operation 110, if the Verify Not Required flag in the LOCATE request is found to be reset, the network node directs (in operation 114) the LOCATE request to the node identified as owning the target resource and then waits for a reply. If an operation 116 shows that the target resource exists at the target node, the cache entry for the resource is updated. The LOCATE Reply is returned to the uptree node in operation 118 with the Verify Not Performed flag reset to indicate that the node has verified the location and characteristics of the target resource.

If operation 116 shows that the target resource is not found in the directed search, the process resumes normal network search logic initiated by operation 82.

It can be seen from the foregoing that network-encompassing LOCATE searches are not required in every instance. Under some conditions, a network node can receive a LOCATE request and respond immediately to that request through the use of cached information. The ability to perform verification operations selectively reduces the amount of network traffic dedicated to LOCATE messages.

Figure 8:
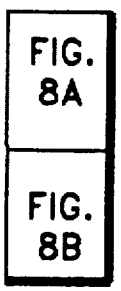
FIG. 8 is an example of operations that are performed in carrying out a LOCATE search in accordance with the present invention.
Figure 8A:
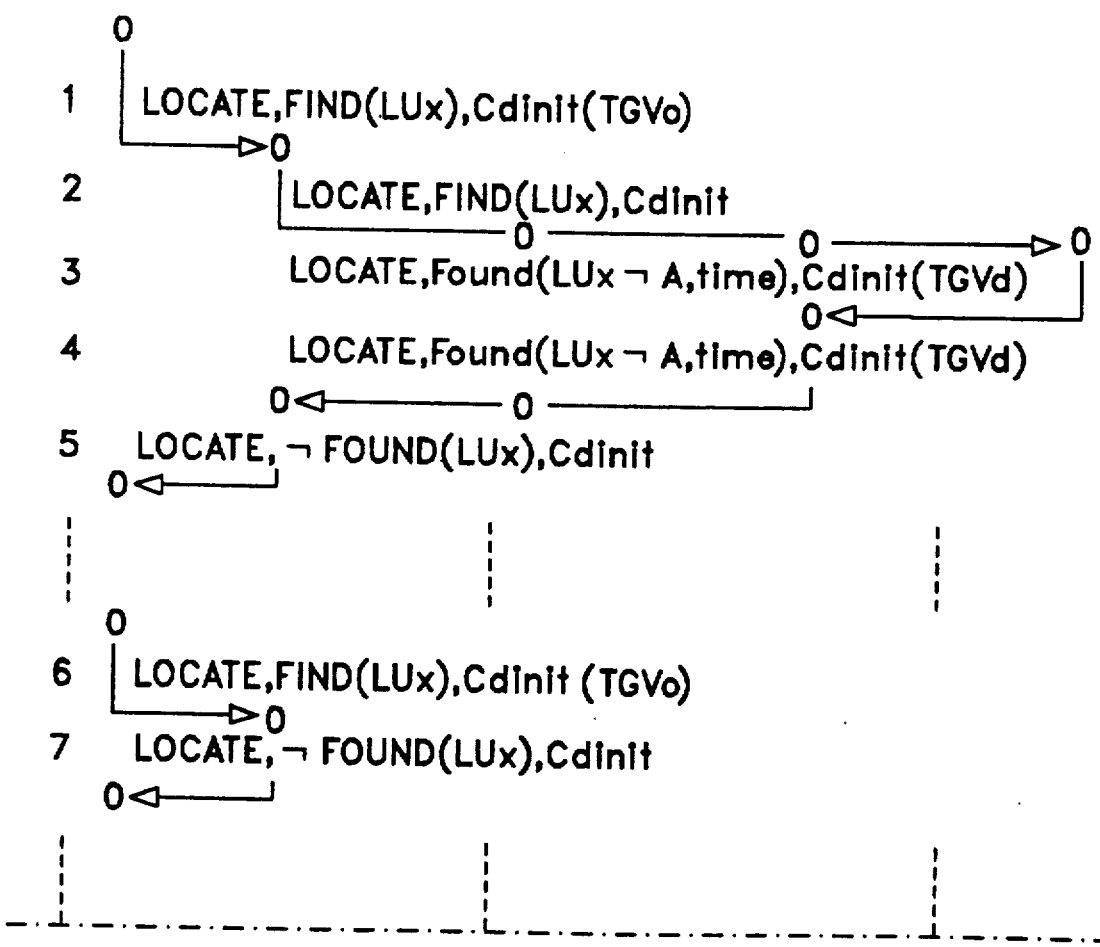
Figure 8B:
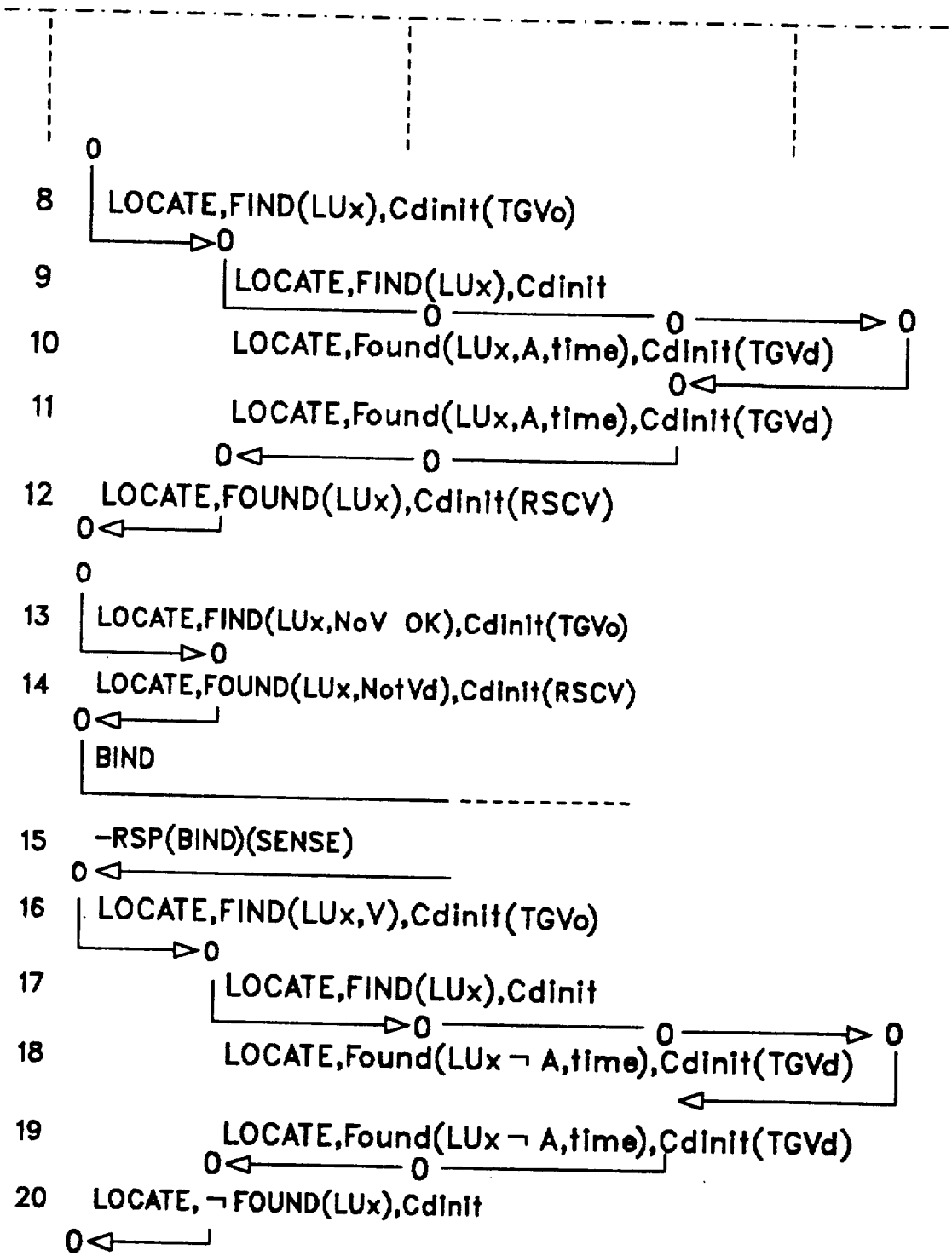

FIG. 8 is a time-based chart of actions taken during a LOCATE process performed in a network assumed to have a first end node 120 including a source of a LOCATE request, a first network node 122 providing network services to the end node 120, a second end node 124 including a target resource, a second network node 126 serving end node 124 and a third or intermediate network node 128. It is assumed that no central directory node is defined for the network. A vertical time scale appears at the left margin of the figure with twenty different time slots during which a step in a LOCATE process is performed.

At time T1, end node 120 sends a LOCATE request to its serving network node 122. The LOCATE request preferably includes transmission group vectors (TGVs) which are used in a least weight route selection process. The route selection process is not part of this invention and will not described further. At time T2, network node 122 determines that the target resource is not known in its domain. Network node 122 broadcasts the LOCATE request to adjacent network nodes including node 128. The LOCATE request is eventually propagated to end node 124. At time T3, end node 124 generates a LOCATE reply indicating the resource exists but is inaccessible for some period of time. The LOCATE reply includes transmission group vectors for the link between end node 124 and network node 126. If network node 126 supports selective verification, it caches the information about the target resource and (at time T4) passes the LOCATE reply through network node 128 to network node 122. Network node 128 also caches the information contained in the LOCATE reply. At time T5, network node 122 caches the information and returns a LOCATE reply to the source's end node 120, indicating the inaccessibility of the target resource.

At a later time T6, the end node 120 renews the LOCATE request and forwards it to its serving network node 122. Because network node 122 now has a cache entry indicating that the target resource is inaccessible, it returns a negative LOCATE reply to end node 120 at time T7. Network node 122 does not attempt to verify the information contained in its cache directory before replying to end node 120.

At a later time T8, end node 120 sends another LOCATE request for the same target resource. Assume by time T8, that the timer has expired for the cache entry at network node 122. Network node 122 responds to the new LOCATE request by directing a search at time T9 to the end node 124 identified in its cache entry. If the target resource has become available, end node 124 will generate a positive LOCATE reply at time T10 with a vector indicating the length of time the resource is expected to remain available. As the LOCATE reply propagates through the network at time T11, each network node caches the information contained in the reply, including the time information. Assuming no other problems arise, a session can be established between end nodes 120 and 124 when the LOCATE reply reaches the end node 120 at time T12.

If the same LOCATE request is generated at a later time T13, the Verify Not Required flag may be set to indicate that verification is not required by the originating node. When this LOCATE request is received at the serving network node 122, the node will respond immediately (at time T14) using cached information. The Verify Not Performed flag will be set in the reply.

Assume the subsequent BIND fails at time T15 because the resource has become inaccessible. When the LOCATE request is re-issued at time T16, the originating end node 120 will reset the Verify Not Required flag in the request. In response to the reset Verify Not Required flag, the network will perform its normal network search logic in a series of steps performed at times T17, T18, T19 and T20. Normal network search logic requires that the LOCATE request be propagated to end node 124, which can verify the location and characteristics of the target resource.

Figure 9:
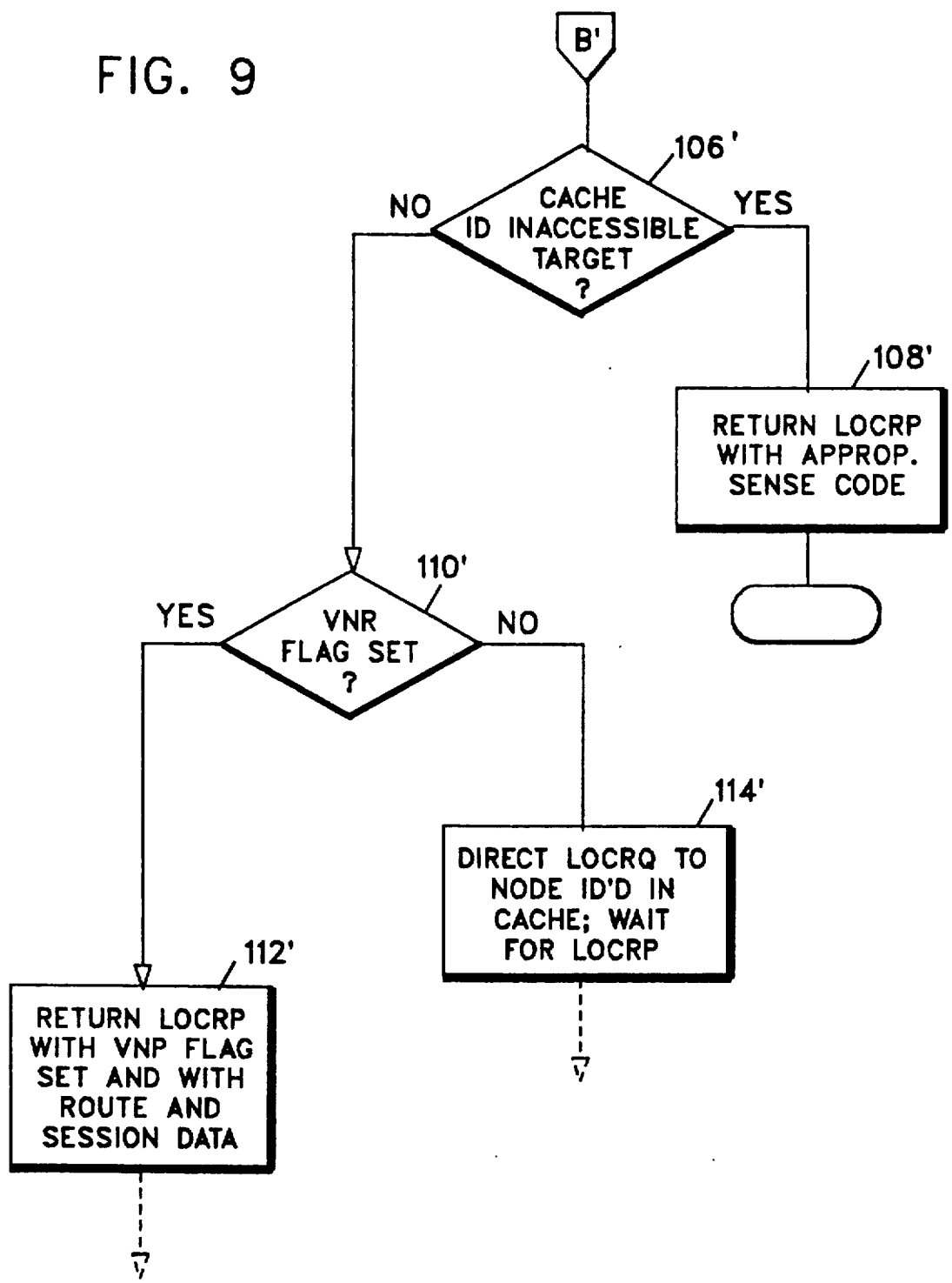
FIG. 9 is a fragment of the flow chart shown in FIG. 7 indicating the changes that define an alternate embodiment of the invention.

In the embodiment described above, the network nodes serving either the source node or the target node can return a LOCATE reply without verification. In an alternative embodiment of the invention, any network node having a cache entry for the target node may be able to return such a reply. The process for allowing any network node to return an unverified reply involves a slight change in the process described with reference to FIG. 7. That change is illustrated in FIG. 9, which is a view of only that portion of the process in which the change is made. FIG. 9 includes operation blocks 106', 108', 110', 112' and 114' which correspond to similarly numbered blocks in FIG. 7. In FIG. 9, however, no check is made as to whether the network node processing a LOCATE request is a designated network node server for either the source node or the target node; that is, an operation corresponding to operation 107 is not performed in the alternative embodiment. It is assumed that any network node with an appropriate cache entry may provide an unverified LOCATE reply.

While there have been described what are considered to be preferred embodiments of the invention, variations and modifications in those embodiments may occur to those skilled in the art once they become aware of the basic inventive concepts. Therefore, it is intended that the appended claims shall be construed to include both the preferred embodiments and all such variations and modifications as fall within the true spirit and scope of the invention.

We claim:

1. In a computer network which includes a plurality of end nodes, at least one network node server for each of said end nodes, and resources associated with said end nodes and said network nodes, each said network node server having a cache directory of information relating to the location and characteristics of at least some of the resources in the network, a method of initiating establishment of a session between a source logical unit associated with a network resource at one of said end nodes and network nodes and a target logical unit associated with a network resource at another one of said end nodes and network nodes, said method comprising the steps of:

generating a LOCATE request at the source logical unit, said LOCATE request identifying a target resource at the target logical unit and including a verification flag indicating whether the location and characteristics of the target resource need be verified in a reply to the LOCATE request;

transmitting the LOCATE request to the network node server for the node containing the source logical unit; and processing the LOCATE request at the network node server, said processing step further comprising the steps of searching the cache directory of the network node for any entry relating to the target resource, if target resource the entry is not found in the searched directory, then initiating a search for the target resource elsewhere in the network by forwarding the search request to other nodes in the network, if the target resource entry is found in the searched directory, then checking the verification flag in the LOCATE request to determine whether the resource location and characteristics are to be verified, if the verification flag indicates verification is not required, returning a LOCATE reply to the node containing the source logical unit, said LOCATE reply being based on the contents of the directory entry, if the verification flag indicates verification is required, forwarding the LOCATE request to the node identified in the directory entry as containing the target resource, receiving a LOCATE reply originating at the node identified in the directory entry, and returning the LOCATE reply to the node containing the source logical unit, said LOCATE reply being based on the verified contents of the directory entry.

2. The method as defined in claim 1 wherein the step of generating the LOCATE request at the source node comprises the further steps of:

determining whether the session to be established possesses certain characteristics;

determining whether a previous unsuccessful attempt was made to establish a session with the target logical unit without verifying the location and characteristics of the target resource; and setting the verification flag in the LOCATE request only if the session possesses the certain characteristics and the previous session-establishing attempt did not fail while attempting to proceed without verification.

3. The method as defined in claim 2 wherein the step of determining whether the session possesses certain characteristics further comprises the steps of:

determining whether the session is to be initiated by a primary logical unit;

determining whether the session is of a type that can tolerate failure in a subsequent session-establishment attempt;

enabling the verification flag to be set only if both determining steps yield positive results.

4. In a data processing network including a plurality of nodes, each of said nodes having one or more associated resources and at least some of said nodes having cache directories containing information about one or more of the resources, a method of initiating establishment of a session between two of said nodes, said method comprising the steps of:

generating a LOCATE request at a first node, said LOCATE request identifying a target resources and including a verification flag indicating whether information relating to the target resource is to be verified in a reply to the LOCATE request;

transmitting the LOCATE request to at least one predetermined node having a cache directory; and processing the LOCATE request at the predetermined node, said processing step further comprising the steps of:

searching the cache directory of the predetermined node for an entry relating to the target resource, if the target resource entry is found, and if the verification flag indicates verification is required, forwarding the LOCATE request to the node containing the target resource, receiving a LOCATE reply indicating verification and originating at the node containing the target resource, and transmitting the LOCATE reply to the first node, and if the verification flag indicates verification is not required, generating a LOCATE reply and transmitting said LOCATE reply to the first node, if the target resource entry is not found, initiating a search for the target resource by directing search inquiries to other nodes in the network.

5. The method as defined in claim 4 wherein the predetermined node is either a network node serving the first node or a network node serving the node containing the target resource.

6. The method as defined in claim 4 wherein the predetermined node is any node in the network.

7. The method as defined in claims 5 or 6 wherein the step of generating the LOCATE request at the first node comprises the further steps of:

determining whether the session to be established possesses certain characteristics;

determining whether a previous unsuccessful attempt was made to establish a session with the second node without verifying the location and characteristics of the target resource; and setting the verification flag in the LOCATE request only if the session possesses the certain characteristics and the previous session-establishing attempt did not fail while attempting to proceed without verification.

8. The method as defined in claim 7 wherein the step of determining whether the session possesses certain characteristics further comprises the steps of:

determining whether the session is to be initiated by a primary logical unit;

determining whether the session is of a type that can tolerate failure in a subsequent session-establishment attempt;

and enabling the verification flag to be set only if both determining steps yield a positive result.

9. In a data processing network including a plurality of nodes, each of said nodes having one or more associated resources and at least some of said nodes having cache directories containing information about one or more of the resources, a system for initiating establishment of a session between two of said nodes, said system comprising:

means for generating a LOCATE request at a first node, said LOCATE request identifying a target resource and including a verification flag indicating whether information relating to the target resource is to be verified in a reply to the LOCATE request;

means for transmitting the LOCATE request to a predetermined node having a cache directory; and means for processing the LOCATE request at the predetermined node, said processing means further comprising:

means for searching the cache directory of the predetermined node for an entry relating to the target resource, means for forwarding the LOCATE request to the node containing the target resource and for receiving a LOCATE reply indicating verification and originating at the node containing the target resource if the target resource entry is found and the verification flag indicates verification is required, means for generatig a LOCATE reply if the target resource entry is found and the verification flag indicates verification is not required, means for transmitting the LOCATE reply to the first node if the target resource entry is found, and means for initiating a search for the target resource if no target resource entry is found by forwarding the LOCATE request to other nodes in the network.

10. The system as defined in claim 9 wherein the predetermined node is either a network node serving the first node or a network node serving the node containing the target resource.

11. The system as defined in claim 9 wherein the predetermined node is any node in the network.

12. The system as defined in claims 10 or 11 wherein said LOCATE request generating means further comprises:

means for determining whether the session to be established possesses certain characteristics;

means for determining whether a previous attempt to establish a session with the second node was unsuccessful, during which attempt the location and characteristics of the target resource were not verified; and means for setting the verification flag in the LOCATE request only if the session possesses the certain characteristics and the previous session-establishing attempt did not fail while attempting to proceed without verification.

13. The system as defined in claim 12 wherein the session characteristic determining means further comprises:

means for determining whether the session is to be initiated by a primary logical unit;

means for determining whether the session is of a type that can tolerate failure in a subsequent session-establishment attempt; and means for enabling the verification flag to be set only if both determining steps yield a positive result.

* * * * *